(12) United States Patent
Farrand et al.

(10) Patent No.: US 8,377,519 B2
(45) Date of Patent: Feb. 19, 2013

(54) LIQUID CRYSTALLINE MEDIUM AND LIQUID CRYSTAL DISPLAY

(75) Inventors: Louise Diane Farrand, Blandford Forum (GB); Harry James Coles, Ely (GB); Mikhail N. Pivnenko, Cambridge (GB); Yong-il Cho, Daejoen (KR)

(73) Assignee: Merck Patent GmbH, Darmstadt (DE)

( * ) Notice: Subject to any disclaimer, the term of this patent is extended or adjusted under 35 U.S.C. 154(b) by 499 days.

(21) Appl. No.: 12/304,034

(22) PCT Filed: May 16, 2007

(86) PCT No.: PCT/EP2007/004387
§ 371 (c)(1),
(2), (4) Date: Aug. 9, 2010

(87) PCT Pub. No.: WO2007/140863
PCT Pub. Date: Dec. 13, 2007

(65) Prior Publication Data
US 2010/0296038 A1   Nov. 25, 2010

(30) Foreign Application Priority Data

Jun. 9, 2006 (EP) .................................. 06011984

(51) Int. Cl.
| | |
|---|---|
| C09K 19/34 | (2006.01) |
| C09K 19/30 | (2006.01) |
| C09K 19/12 | (2006.01) |
| C09K 19/20 | (2006.01) |
| C09K 19/54 | (2006.01) |
| C09K 19/58 | (2006.01) |
| G02F 1/1333 | (2006.01) |

(52) U.S. Cl. ......... 428/1.1; 349/123; 349/132; 349/185; 252/299.61; 252/299.63; 252/299.66; 252/299.67

(58) Field of Classification Search ................... 428/1.1; 252/299.01, 299.61, 299.63, 299.66, 299.67, 252/299.5; 349/123, 132, 185
See application file for complete search history.

(56) References Cited

U.S. PATENT DOCUMENTS

| | | | |
|---|---|---|---|
| 7,041,348 B2 * | 5/2006 | Ionescu | 428/1.3 |
| 2005/0041197 A1 * | 2/2005 | Ionescu | 349/185 |
| 2005/0266175 A1 | 12/2005 | Hsu et al. | |

FOREIGN PATENT DOCUMENTS

| | | |
|---|---|---|
| EP | 0971016 A1 | 1/2000 |
| EP | 1256617 A1 | 11/2002 |
| EP | 1477547 A1 | 11/2004 |
| GB | 2356629 A | 5/2001 |
| GB | 2387603 A | 10/2003 |
| WO | 2005075603 A | 8/2005 |
| WO | 2007004387 R | 8/2007 |

OTHER PUBLICATIONS

Blatch, A. E. et al. "Symmetric and Non-Symmetric Liquid Crystal Dimers with Branched Terminal Alkyl Chains: Racemic and Chiral." (Journal of Material Chemistry). Jan. 1997, 9-17, 7:1.

Bryan-Brown, G.P. et al. "Weak Surface Anchoring of Liquid Crystals." (Nature). Sep. 1999, 338-340, 399.

Coles, H. J. et al. "The Effect of the Molecular Structure on Flexoelectric Coupling in the Chiral Nematic Phase." (Journal of Material Chemistry). Oct. 5, 2001, 2709-2716, 11.

Musgrave, B. et al. "A New Series of Chiral Nematic Bimesogens for the Flexoelectro-optic Effect." (Liquid Crystals). Aug. 1999, 1235-1249, 26:8.

* cited by examiner

*Primary Examiner* — Shean C Wu
(74) *Attorney, Agent, or Firm* — Millen, White, Zelano & Branigan, P.C.

(57) ABSTRACT

The instant invention relates to liquid crystal media comprising one or more bimesogenic compounds, one or more chiral dopants and one or more additives, liquid crystal displays comprising these media, in particular displays exploiting the flexoelectric effect and to a method of improving the response time of such displays.

15 Claims, 2 Drawing Sheets

LIQUID CRYSTALLINE MEDIUM AND LIQUID CRYSTAL DISPLAY

FIELD OF THE INVENTION

The present invention relates to bimesogenic compounds and liquid crystal media comprising one or more bimesogenic compounds, one or more chiral dopants and one or more fluorosurfactants; to liquid crystal displays comprising these media, in particular displays exploiting the flexoelectric effect and to a method of improving the response time of such displays.

STATE OF THE ART AND PROBLEM TO BE SOLVED

Liquid Crystal Displays (LCDs) are widely used to display information. Examples of electro-optical modes employed are the twisted nematic (TN)-, the super twisted nematic (STN)-, the optically compensated bend (OCB)-and the electrically controlled birefringence (ECB)-mode with their various modifications, others are also known. Besides these modes, which all use an electrical field which is substantially perpendicular to the substrates, respectively to the liquid crystal layer, there are also electro-optical modes employing an electrical field substantially parallel to the substrates, respectively the liquid crystal layer, for example the In-Plane Switching (IPS) mode, as disclosed e.g. in DE 40 00 451 and EP 0 588 568. In particular this electro-optical mode is used for LCDs for modern desktop monitors. In IPS displays, like in Ferroelectric Liquid Crystal Displays (FLCDs), the liquid crystals are switching their axis of preferred orientation in the plane of the display. Thus there is almost no birefringence change during switching and consequently the optical effect is colour neutral.

Flexoelectric compounds and the flexoelectro-optic effect are known e.g. from Chandrasekhar, 'Liquid Crystals', $2^{nd}$ edition, Cambridge University Press, R. B. Meyer and J. S. Patel, Phys. Review Lett., 1987, 58 (15), 1538 and by P. Rudquist and S. T. Lagerwall, Liq. Cryst., 1997, 23 (4), 503.

Displays using the flexoelectric effect in cholesteric liquid crystals in the Uniformly Lying Helix texture have been proposed (Phys. Rev. Lett. 58 (15), p. 1538-1540 (1987)). Throughout this application the terms chiral nematic and cholesteric are used synonymously, unless explicitly stated otherwise. The flexoelectric effect itself is known from Meyer (Phys. Rev. Lett. 22, p. 918 ff (1969)) and has more recently been reviewed by Rudquist et al. (Liq. Cryst. 22 (4), 445-449 (1997).

Displays which use the flexoelectro-optic effect benefit from sub-millisecond switching times, in-plane switching which gives an excellent viewing angle and analogue switching giving a true grey scale. Additionally, the response times are due to material properties rather than applied field, and low fields are required for a 45° switch. The 'on' and 'off' times are equal.

Liquid crystal compositions with short cholesteric pitch for flexoelectric devices are known from EP 0 971 016, GB 2 356 629 and Coles et al., J. Mater. Chem., 11, p. 2709-2716 (2001). EP 0 971 016 teaches mesogenic estradiols, which, as such, have a high flexoelectric coefficient.

GB 2 356 629 teaches bimesogenic compounds and their use in flexoelectric devices. Bimesogens have shown several advantages over usual monomesogens including higher flexoelectric coefficients; the tilt per unit field is up to an order of magnitude greater than with conventional mesogens. The molecular design of bimesogens minimises the dielectric coupling which reduces the helix from unwinding whilst maximising the flexoelectric response allowing for faster switching and lower fields.

Monomesogens switch through low angles typically at 5-10° at fields typically of 5-10 volts per micron, whereas bimesogens switch through 22.5° at 3 volts per micron and switch almost independently of temperature.

In the uniform lying helix (ULH) texture a cholesteric liquid crystal with a short pitch is unidirectionally aligned with its helical axis parallel to the substrates, e.g. glass plates, of a liquid crystal cell. The helical axis of the cholesteric liquid crystal is equivalent to the optical axis of a birefringent plate. The uniformly lying helix texture generally is realized using a chiral nematic liquid crystal with a short pitch, typically in the range from 0.2 µm to 1.0 µm, preferably of 1.0 µm or less, in particular of 0.5 µm or less.

If an electrical field is applied to electrodes on the substrates, preferably on their inner surfaces, in this configuration, i.e. normal to the helical axis, the optical axis is rotated in the plane of the cell. This rotation is similar to the rotation of the director of a ferroelectric liquid crystal in a surface stabilized ferroelectric liquid crystal display. The flexoelectric effect is characterised by fast response times, typically in the range from 60 µs to 100 µs. It further features excellent grey scale capability.

The electric field can be seen to essentially couple flexoelectrically to the induced splay-bend deformation of the director. The angle of the rotation of the axis, in first approximation, is directly and linearly proportional to the strength of the electrical field. The optical effect can be observed best, when the liquid crystal cell is placed between crossed polarisers with the optical axis in the non-powered state at an angle of 22.5° to the absorption axis of one of the polarisers. This angle of 22.5° also is the ideal angle of rotation of the of the helical axis with the electric field, as thus, by the inversion the electrical field, the optical axis is rotated by 45° and by appropriate selection of the relative orientations of the preferred direction of the axis of the helix, the absorption axis of the polariser and the direction of the electric field, the optical axis can be switched from parallel to one polariser to the centre angle between both polarisers. The optimum contrast is achieved when the total angle of the switching of the optical axis is 45°. In that case the arrangement can be used as a switchable quarter wave plate, provided the optical retardation, i.e. the product of the effective birefringence of the liquid crystal and the cell gap, is selected to be the quarter of the wavelength. In this context the wavelength referred to is 550 nm, the wavelength for which the sensitivity of the human eye is highest, unless explicitly stated otherwise.

The angle of rotation of the optical axis (O) is given in good approximation by formula (1).

$$\tan \phi = \bar{e} P_0 E / (2\pi K) \tag{1}$$

wherein $P_0$ is the undisturbed pitch of the cholesteric liquid crystal, $\bar{e}$ is the average $[\bar{e}=\frac{1}{2}(e_{splay}+e_{bend})]$ of the splay flexoelectric coefficient ($e_{splay}$) and the bend flexoelectric coefficient ($e_{bend}$), E is the electrical field strength and K is the average $[K=\frac{1}{2}(k_{11}+k_{33})]$ of the splay elastic constant ($k_{11}$) and the bend elastic constant ($k_{33}$)

and wherein the ratio $\bar{e}/K$ is called the flexo-elastic ratio.

This angle of rotation ($\phi$) is half the switching angle in a flexoelectric switching element.

The response time ($\tau$) of this electro-optical effect is given in good approximation by formula (2).

$$\tau = [P_0/(2\pi)]^2 \cdot \gamma/K \quad (2)$$

wherein
$\gamma$ is the effective viscosity coefficient associated with the distortion of the helix.

There is a critical field ($E_c$) to unwind the helix, which can be obtained from equation (3).

$$E_c = (\pi^2/P_0) \cdot [k_{22}/(\epsilon_0 \cdot \Delta\epsilon)]^{1/2} \quad (3)$$

wherein
$k_{22}$ is the twist elastic constant,
$\epsilon_0$ is the permittivity of vacuum and
$\Delta\epsilon$ is the dielectric anisotropy of the liquid crystal.

A chiral substance mixed with a nematic material induces a helical twist transforming the material into a chiral nematic material, which is equivalent to a cholesteric material. The terms chiral nematic and cholesteric are used synonymously in this application, unless explicitly stated otherwise. One difference between a cholesteric pure material and a chiral nematic mixture, however, is the fact, that the cholesteric pitch of the latter can be varied over a rather large range with comparative ease. The pitch induced by the chiral substance is in a first approximation inversely proportional to the concentration of the chiral material used. The constant of proportionality of this relation is called the helical twisting power (HTP) of the chiral substance and defined by equation (4)

$$HTP \equiv 1/(c \cdot P_0) \quad (4)$$

wherein
c is concentration of the chiral compound.

For these displays new liquid crystalline media with improved properties are required. Especially the birefringence ($\Delta n$) should be optimised for the optical mode. i.e. the optical retardation ($d \cdot \Delta n$) should be preferably such that the equation (5)

$$\sin^2(\pi \cdot d \cdot \Delta n/\lambda) = 1 \quad (5)$$

wherein
d is the cell gap and
$\lambda$ is the wavelength of light
is satisfied. The allowance of deviation for the right hand side of equation (4) is +/−3%.

The wavelength of light generally referred to in this application is 550 nm, unless explicitly specified otherwise.

Flexoelectric displays using the ULH-mode, like in plane switching and ferroelectric displays, inherently have a black and white response with a very wide viewing angle. Thus, the colour representation is almost independent of the angle of observation. This fact positively contrasts from the situation for displays exploiting birefringent effects, like TN, STN and ECB displays.

Compared to IPS displays, flexoelectric displays are characterized by their extremely fast response time, whereas compared to FLCDs, they are preferred, as they allow direct representation of grey scales, having a voltage dependent switching angle and are not showing bistable response as in the case of FLCDs.

However, so far, there has been a problem to achieve the orientation of the cholesteric liquid crystals in the uniaxially lying helix texture in a reproducible way. Coles et al., J. Mater. Chem., 2001, 11, pp. 2709-2716, mentioned above, reports that monomesogenic liquid crystals containing a chiral additive, which exhibit blue phases promote the easy formation of the uniaxially lying helix texture. When such materials are enclosed in liquid crystal cells between two walls, at least one of which is provided with an alignment layer for planar alignment, they spontaneously form a uniformly lying helix texture upon application of an alternating electrical field across the material while it is in its blue phase. Subsequently the sample is cooled into the cholesteric phase under the applied field. In this case no mechanical manipulation, like shearing the liquid crystal sample, is required to obtain the uniform alignment. However, this reference only discloses only cholesteric liquid crystal materials based on monomesogenic liquid crystal materials but does not even mention bimesogenic liquid crystals.

It further has been reported by Blatch et al., J. Mater. Chem., 1997, 7(1), pp. 9-17, that liquid crystal materials comprising bimesogenic liquid crystals with an odd number of atoms in the spacer group, which are further comprising a chiral centre sufficient to achieve a helical pitch of 500 nm or less, do generally exhibit blue phases.

Thus, there is a significant need for liquid crystalline media with fast switching i.e. small response times for practical applications such as computer monitors, screens for television sets and the like, displays for multi media applications, hand held telecommunication devices automatic teller machines and light modulators. They have to have a wide nematic phase range, low viscosities, a low $\Delta\epsilon$, high flexoelectric coefficients, a sufficiently high resistivity and, in particular, an appropriately optimised optical anisotropy $\Delta n$—for a given cell thickness depending on the display mode used.

G. P. Bryan-Brown, E. L. Woods and I. C. Sage, Nature 1999, 399, 338 describes the use of the fluorosurfactant Fluorad 430 (short F430) from 3M, U.S.A., a fluoroaliphatic polymeric ester in a nematic liquid crystal to weaken interaction with the cell surface to create slippery surfaces.

However, to realise commercial devices using the flexoelectro-optic effect, even further improvements in reduction of field and switching times are required. For example: B. Musgrave, P. Lehman and H. J. Coles, Liq. Cryst., 1999, 26 (8) 1235 observed short response times but only at high temperatures in the range of 70° C. to 120° C., i.e. not in the normal operating temperature range of a practically usable display.

PRESENT INVENTION

Surprisingly, it has been found that the addition of a small concentration of fluorosurfactants to a mixture of one or more bimesogens and one or more chiral dopants, the response times of liquid crystal displays according to the present invention using the flexoelectric effect can be improved by about 50%. In addition, the applied field required to induce a tilt angle of 22.5°, which is required for optimum modulation, is reduced by over 20%. This contributes to the realisation of more economical driving schemes and more energy efficient devices.

No adverse effects such as an undesired lowering of the clearing point are observed.

An additional beneficial effect is the reduction of the time required to fill the liquid crystalline mixture into the cell, when a mixture contains a fluorosurfactant.

The liquid crystal displays according to the present invention are using the flexoelectric effect in chiral nematic devices that are oriented in the ULH texture. They are preferably used in displays or in electro-optical devices like switches for light or they are used e.g. in optical components.

The cell gap of the cells preferably is in the range from 1 µm to 20 µm, in particular with in the range from 2.0 µm to 10 µm.

Preferably the displays according to the present invention are addressed by an active matrix i.e. a matrix of active electrical elements with a non-linear current-voltage characteristic. These active elements preferably are thin film transistors (TFTs). They can be used for direct view applications as well as for projection type displays. However, the inventive liquid crystals can also beneficially be used in displays with other known addressing means.

Surprisingly, it now has been found, that chiral nematic liquid crystalline media can be aligned in the ULH texture upon application of an alternating electrical field by using an intrinsically non-symmetric system.

This non-symmetry can be easily introduced into the system in the following ways. In a first preferred embodiment the inner surfaces of the substrates of the display are treated to align liquid crystals in a Hybrid alignment. This means that one surface induces planar alignment, also called homogeneous alignment, whereas the other surface induces homeotropic alignment. Obviously in both alignments the liquid crystals may exhibit a finite surface tilt angle.

These displays according to the present invention do not exhibit the drawbacks of the displays of the prior art or at least do exhibit them to a significantly lesser degree.

Preferably the liquid crystalline materials used in the displays according to the present invention have an induced chiral nematic phase.

The base mixtures of the liquid crystalline media preferably have a positive dielectric anisotropy, in order to further the alignment of the axis of the helix in the plane of the cell. However, at the same time, the dielectric anisotropy of the base mixture should be limited, as otherwise there would be an undesired dielectric unwinding of the helix upon application of the electrical field instead of the desired flexoelectric switching of the axis of the helix.

The dielectric anisotropy of the liquid crystalline mixture preferably is in the range from 0 or more to 10 or less and in particular from 0.1 or more to 5 or less.

The unwinding voltage for the helical structure of the mixture is typically 30V or more, preferably 50V or more for a 5 µm thick cell at the operating temperature.

The switching angle for the liquid crystalline mixture is typically 5° or more, preferably 10° or more, more preferably 15° or more, and especially 22.5° for a voltage of typically 10V or more, for 5 µm cell thickness, at the operating temperature.

The improved liquid crystalline displays according to the instant application fulfil the following conditions. They comprise
- a pair of substrates
  - each bearing one or more electrodes and
  - at least one of them bearing an orientation layer for planar alignment of liquid crystals or being otherwise treated for planar orientation of liquid crystals,
- a cholesteric liquid crystal material comprising
  - a component A, comprising, preferably consisting of one or more bimesogenic compounds, preferably with a symmetric structure and an odd number of atoms in the spacer group between the two mesogenic units and/or one or more bimesogenic compounds with a non-symmetric structure, preferably with an odd number of atoms in the spacer group between the two mesogenic units,
  - a chiral component, component B, consisting of one or more compounds, and
  - an additive component, component C, preferably consisting of one or more fluorosurfactants.

Preferably the cholesteric liquid crystal material is aligned in a uniformly lying helix structure with a helical pitch preferably lower than 500 nm, more preferably lower than 400 nm, and, most preferably lower than 300 nm or less.

Further, preferably
- both substrates are bearing an orientation layer for planar alignment of liquid crystals or being otherwise treated for planar alignment of liquid crystals and/or
- component A comprises one or more bimesogenic compounds with a non-symmetric structure.

Preferably the chiral component, component B, consists of one or more chiral compounds.

Preferably the bimesogenic component, component A, comprises one or more compounds of formula I

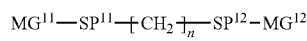

wherein $SP^{11}$ and $SP^{12}$, independently of each other are —O—, —CO—O—, —O—CO—, —CF$_2$—O—, —O—CF$_2$—, —C≡C— or a single bond, preferably —O—, —CO—O—, —O—CO—, —C≡C— or a single bond, more preferably —O—, —CO—O—, —O—CO— or —C≡C— and most preferably —O— or —C≡C—, n is an integer in the range from 2 to 18, preferably from 3 to 17, more preferably from 5 to 13.

$MG^{11}$ is

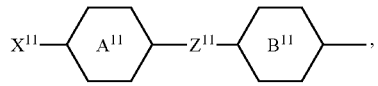

$MG^{12}$ is

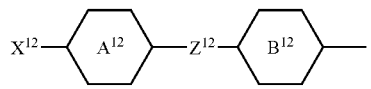

wherein

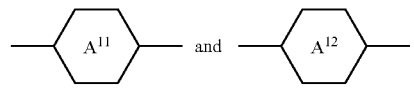

independently of each other are

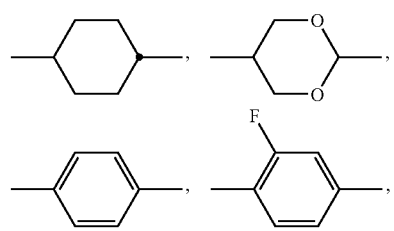

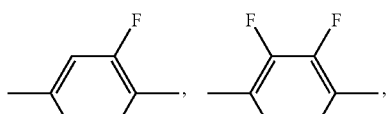

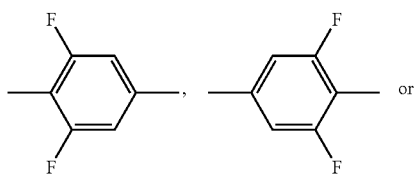

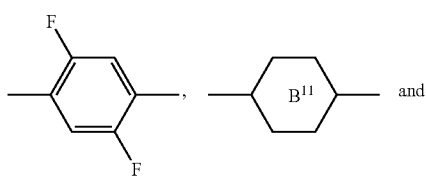

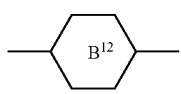

independently of each other are

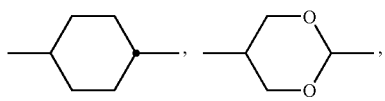

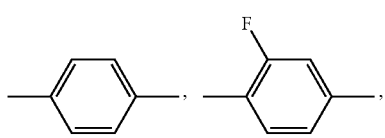

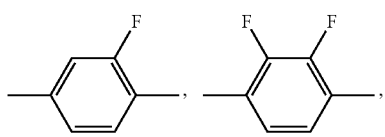

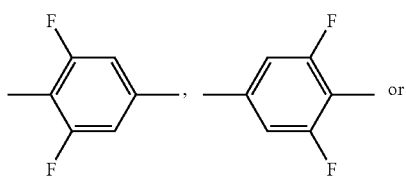

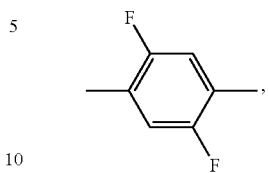

preferably

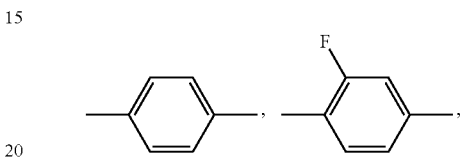

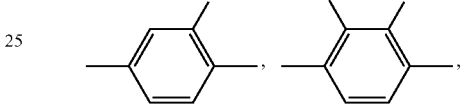

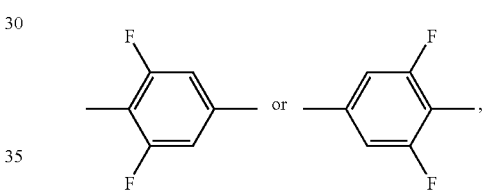

$X^{11}$ and $X^{12}$ independently of each other are CN, F, Cl or alkyl, alkoxy, fluorinated alkyl or fluorinated alkoxy, each with 1 to 4 C-atoms, preferably CN, F, Cl or alkyl, most preferably CN or F and $Z^{11}$ and $Z^{12}$ independently of each other are —CO—O—, —O—CO—, —CH$_2$—O—, —O—CH$_2$—, —CF$_2$—O—, —O—CF$_2$—, —CH$_2$—CH$_2$—, —C≡C—, —CH(CH$_3$)—N=CH— or a single bond, preferably a single bond.

Preferably n is an odd integer.

In a preferred embodiment the bimesogenic component, component A, comprises one or more compounds of formula I, wherein MG$^{11}$ and MG$^{12}$ are identical to each other.

In another preferred embodiment the bimesogenic component, component A, comprises one or more compounds of formula I, wherein MG$^{11}$ and MG$^{12}$ are different from each other.

Preferably the bimesogenic component, component A comprises one or more compounds selected from the group of formulae I-1 to I-3

I-1

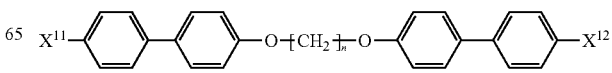

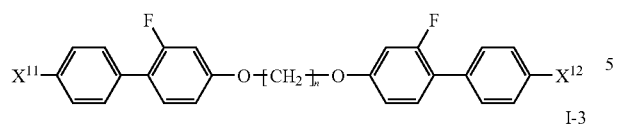

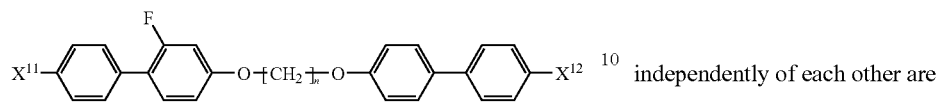

wherein
X¹¹X¹² and n, have the respective meanings given under formula I.

Preferably the chiral component, component B comprises one or more compounds selected from the group of formulae II and III

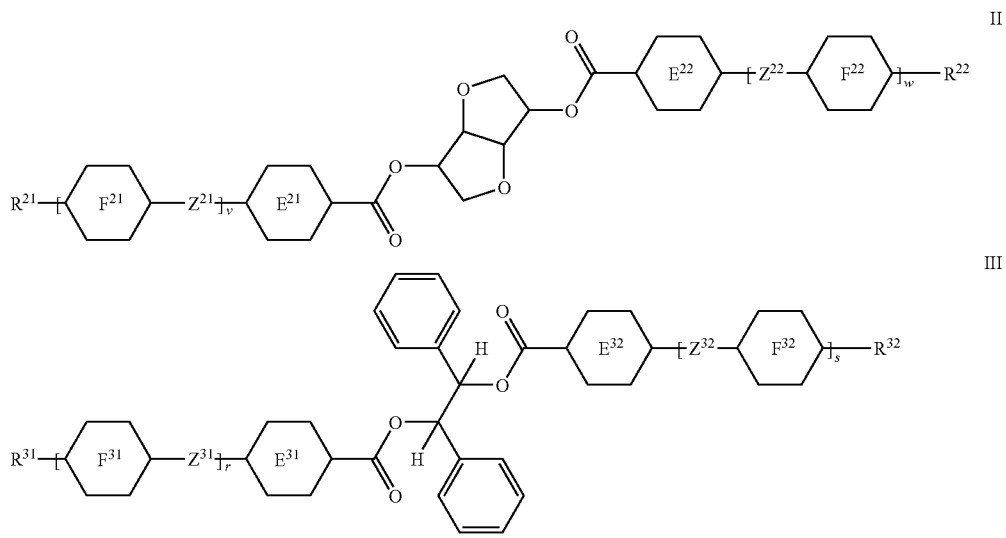

wherein

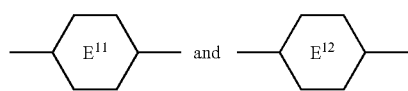

independently of each other are

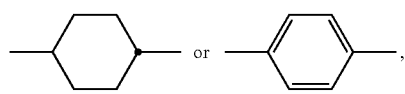

wherein the phenyl ring optionally may be fluorinated, preferably

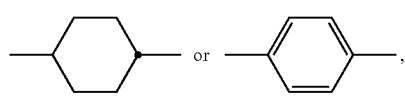

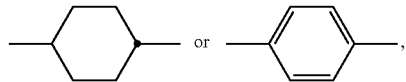

independently of each other are

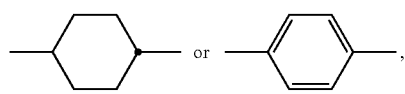

wherein the phenyl ring optionally may be fluorinated, preferably

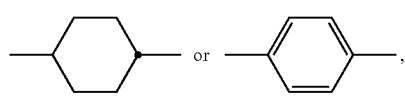

$R^{21}$, $R^{22}$, $R^{31}$ and $R^{32}$ independently of each other are alkyl or alkoxy, each with 1 to 17 C-atoms or alkenyl, alkenyloxy or oxaalkyl, each with 2 to 17 C-atoms, al of which optionally may be fluorinated, preferably $R^{21}$ and $R^{22}$ are identical to each other and most preferably they are n-alkyl, $Z^{21}$, $Z^{22}$, $Z^{31}$ and $Z^{32}$ independently of each other are —CO—O—, —O—CO—, —CH₂—O—, —O—CH₂—, —CH₂—CH₂— or a single bond, and v, w, r and s independently of each other are 0 or 1 and optionally one or more of the phenyl rings shown in formula III may be fluorinated.

Preferably the elements of the following four pairs of parameters

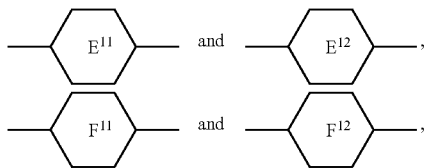

$Z^{21}$ and $Z^{22}$, and
$Z^{31}$ and $Z^{32}$ are mutually identical to each other or are each others mirror images, preferably they are each others mirror images, the elements of the following two pairs of parameters $R^{21}$ and $R^{22}$, and
$R^{31}$ and $R^{32}$ are mutually identical to each other, and v and w are identical to each other and r and s are identical to each other.

Fluorosurfactants according to the present application are compounds which comprise, and in most cases even basically consist of, chains of carbon atoms which are surrounded by fluorine atoms. As surfactants they have an amphiphilic structure, i.e. are composed of groups of opposing solubility tendencies in different media, e.g. water and oil. They are preferably characterised by very low surface tensions, preferably by dynamic surface tensions of 45 mN/m or less, preferably of 40 mN/m or less and more preferably of 35 mN/m or less at a bubble frequency of 5 Hz.

Preferably the additive component, component C, comprises one or more compounds selected from the following group of compounds fluorosurfactants, preferably non-ionic fluorosurfactants, most preferably non-ionic polymeric fluorosurfactants, and oligofluorinated alcohols, preferably of formula IV

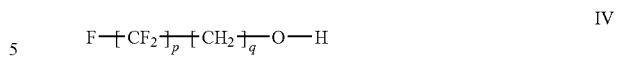

wherein p is an integer in the range from 1 to 15, preferably from 2 to 12 and most preferably from 4 to 10 and q is an integer in the range from 0 to 8, preferably in the range from 1 to 3.

Fluorosurfactants, which exemplify these types of compounds and which, at the same time are preferably used according to the present invention, are FC-430 (having Mn=489 and Mw=1365), FC-4430 and FC-4432, all of 3M, U.S.A.

The additive component, component C, preferably comprises one or more compounds with dynamic surface tensions of 45 mN/m or less, preferably of 40 mN/m or less and more preferably of 35 mN/m or less at a bubble frequency of 5 Hz and preferably even at a bubble frequency of 10 Hz.

For reference the dynamic surface tensions of the three exemplary fluorosurfactants mentioned above are shown in the following table.

| Bubble freq./Hz | Compound | | |
| --- | --- | --- | --- |
| | FC-430 | FC-4430 | FC-4432 |
| | Dynamic surface tension/mN/m | | |
| 1 | 39 | 32 | 34 |
| 3 | 41 | 34 | 37 |
| 5 | 42 | 36 | 39 |
| 8 | 43 | 38 | 40 |
| 10 | 44 | 39 | 41 |
| 12 | 45 | 40 | 42 |

Particularly preferred compounds of formula II, wherein $MG^{11}$ and $MG^{12}$ are identical to each other, are

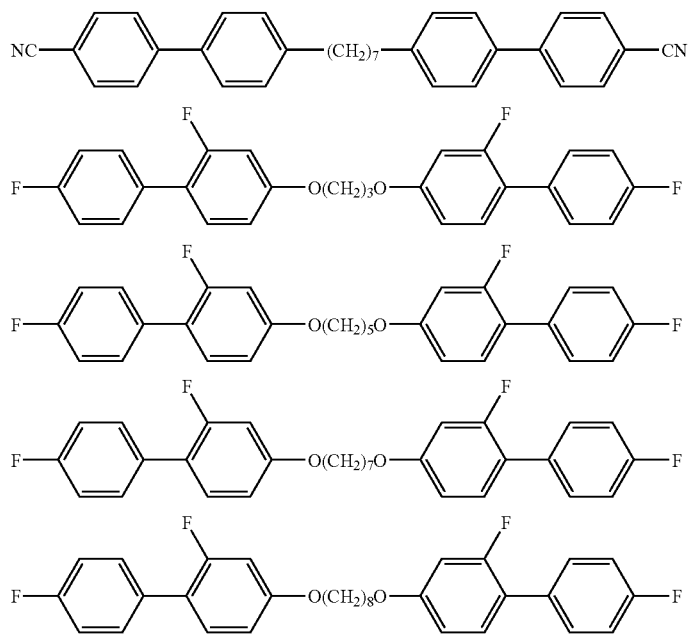

-continued
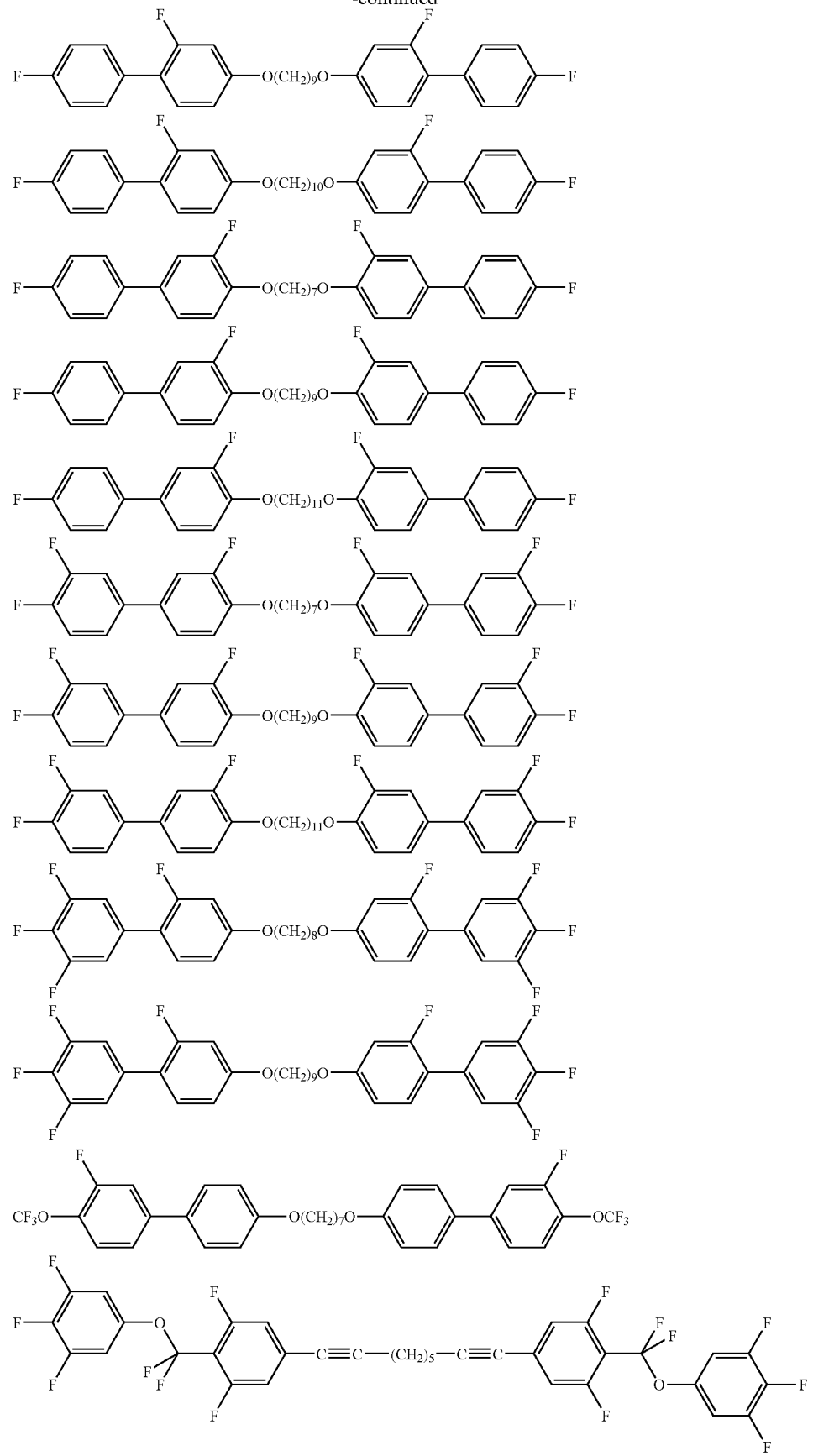

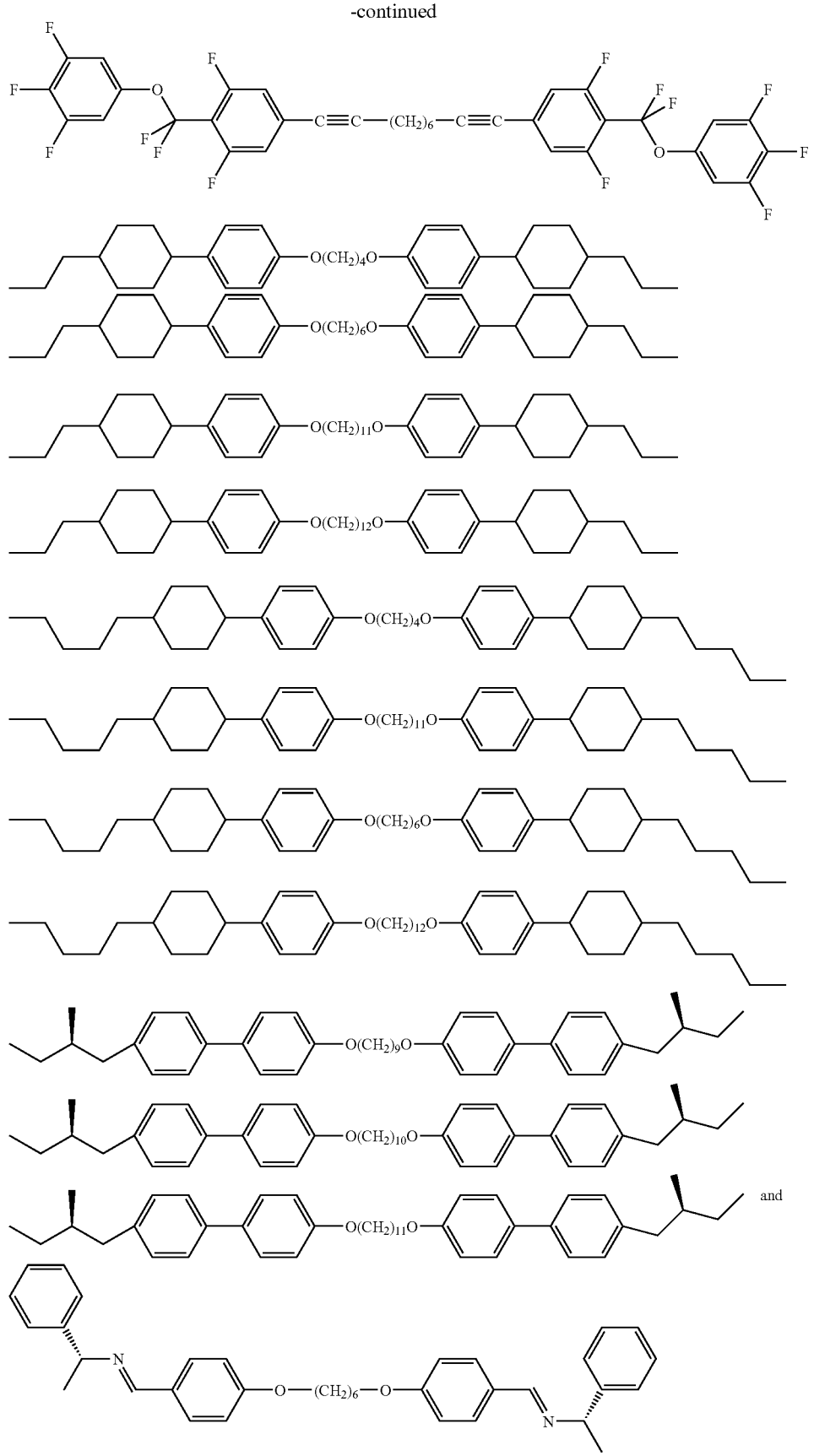

Particularly preferred compounds of formula I, wherein $MG^{11}$ and $MG^{12}$ are different from each other, are

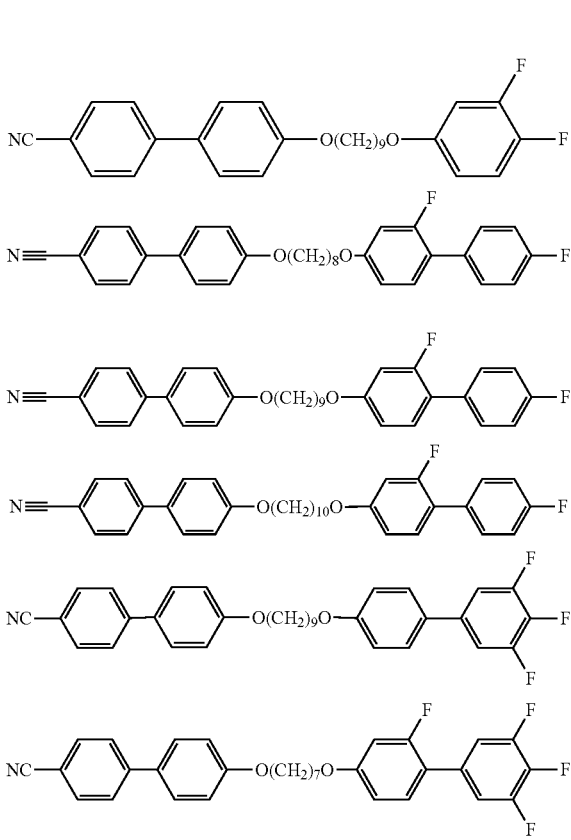

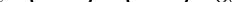

Particularly preferred compounds of formula I-2 are

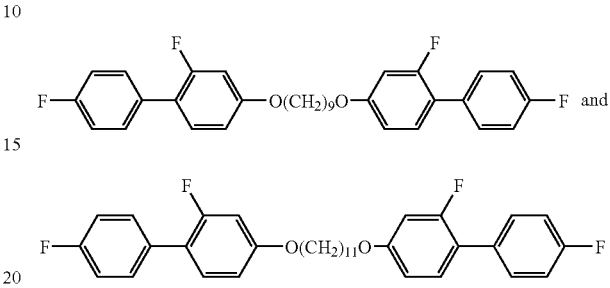

A particularly preferred compound of formula I-3 is

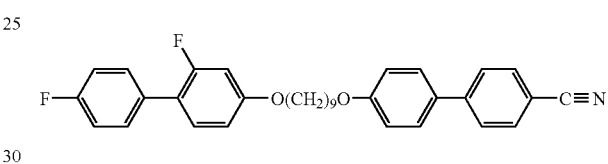

The synthesis of this compound is disclosed e.g. in Cho, Y. PhD thesis, University of Cambridge (2005).

A particularly preferred compound of formula II is

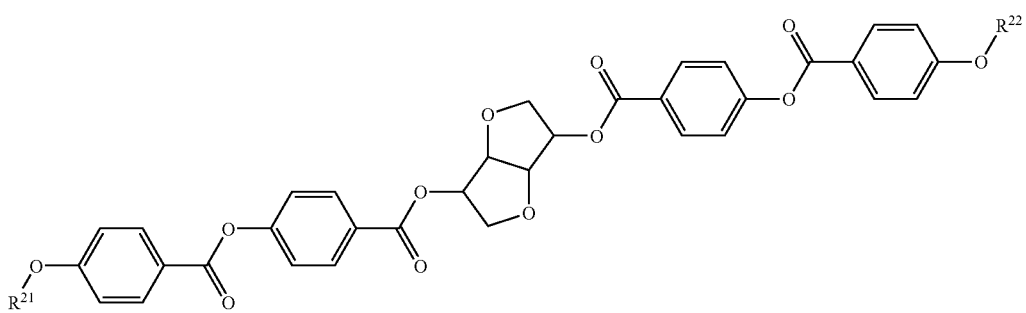

-continued

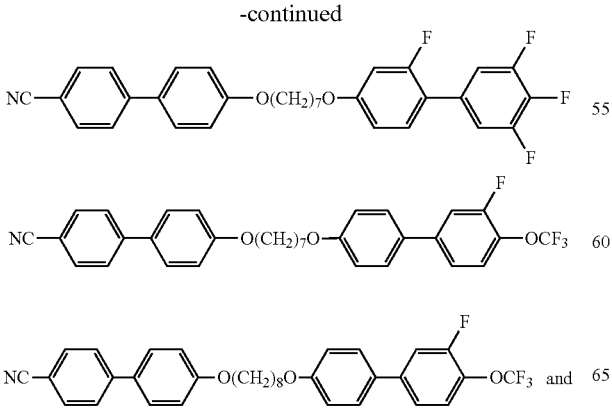

wherein $R^{21}$ and $R^{22}$ have the respective meanings given under formula II above and wherein the one or more of the phenyl rings optionally may be substituted by fluorine.

A particularly preferred compound of formula IV is

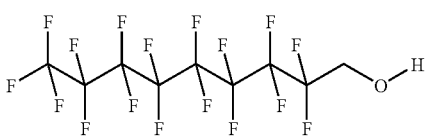 [SMILES: OCC(F)(F)C(F)(F)C(F)(F)C(F)(F)C(F)(F)C(F)(F)C(F)(F)C(F)(F)F]

The improved liquid crystalline displays according to a preferred embodiment of the instant invention comprise a chiral component (component B) which induces a cholesteric pitch of the liquid crystal material of 500 nm or less, preferably of 450 nm or less and especially preferred of 400 nm or less.

In a further preferred embodiment of the instant invention, which may be different from the embodiment described above, the alternating electrical field applied to align the liquid crystal material is preferably lower than the critical field for helix unwinding. For practical reasons it is preferably 12 V/m or less and most preferably 4 V/m or less.

In a further preferred embodiment of the instant invention, which may be different from the embodiments described above, a liquid crystal cell with surfaces treated for planar alignment is used. In this embodiment the preferred starting condition for the orientation of the liquid crystal material is the Grandjean texture. In this embodiment, which is independent from the two previous embodiments, the strength of the aligning field is applied, ramped up and/or increased gradually at the critical field only for the helix unwinding. This allows for true homeotropic alignment in case the liquid crystal material has a positive dielectric anisotropy, which is generally preferred in this application and especially in the instant embodiment. Then the aligning field is decreased gradually from its maximum value, preferably the critical field, until a good uniform lying helix alignment is achieved, over a defined time span. This time span preferably is in the range of 1 second to 2 hours, more preferably in the range of 1 second to 600 seconds and most preferably in the range from 1 second to 60 seconds. For reasons of productivity the time span should be as short as possible, while a sufficient time has to be allowed to ensure proper orientation.

A sweeping speed of 20 V/(µm·min) has been found useful in most cases.

The chiral nematic phase of the liquid crystal materials preferably extends over a range of 10 degrees centigrade or more, preferably over a range of 20 degrees centigrade or more and most preferably over a range 30 degrees centigrade or more The sequence of textures typically observed in a sample of an inventive medium upon application of an electric field is as follows:

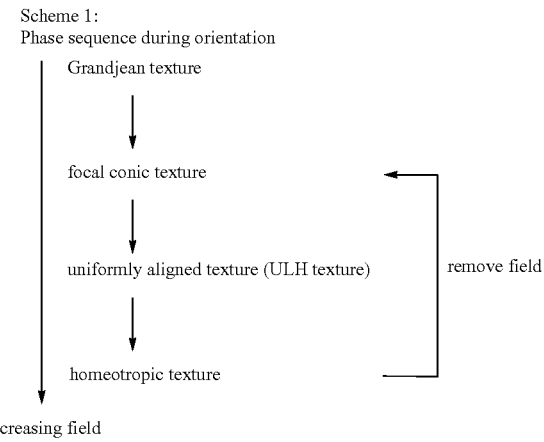

Scheme 1:
Phase sequence during orientation

Comprising in this application means in the context of compositions that the entity referred to, e.g. the medium or the component, contains the component or components or of the compound or compounds in question, preferably in a total concentration of 10% or more and most preferably of 20% or more.

Predominantly consisting, in this context, means that the entity referred to contains 80% or more, preferably 90% or more and most preferably 95% or more of the component or components or of the compound or compounds in question.

Entirely consisting, in this context, means that the entity referred to contains 98% or more, preferably 99% or more and most preferably 100.0% of the component or components or of the compound or compounds in question.

Also other mesogenic, as well as non-mesogenic, compounds, which are not explicitly mentioned above, can optionally and in certain cases beneficially are used in the media according to the instant invention. Such compounds are known to the expert in the field.

Component A preferably is used in a concentration from 90% to 99.9%, preferably from 90% to 95%.

Component B preferably is used in a concentration from 0.1% to 10%, preferably from 1% to 5% of the total mixture.

Component C preferably is used in a concentration from 0.01% to 8%, preferably from 0.1% to 6% and in particular from 0.5% to 4% of the total mixture.

Optionally, the media to be used in the inventive displays can comprise further liquid crystal compounds in order to adjust the physical properties. Such compounds are known to the expert. Their concentration in the media according to the instant invention is preferably 0% to 99.9%.

Preferably the liquid crystal medium to be used according to the present invention contains 50% to 100%, more preferably 70% to 100% and most preferably 80% to 100% and in particular 90% to 100% totally of components A, B and C, which contain, preferably predominantly consist of and most preferably entirely consist of one or more of compounds selected from the group of formulae I, II, III and IV and polymeric fluoroaliphatic esters such as FC-430 from 3M, U.S.A. and the like, respectively.

The $\Delta n$ of the liquid crystal media to be used according to the instant invention is 0.215 or more, preferably in the range of 0.100 to 0.300.

The $\Delta\varepsilon$, at 1 kHz and 20° C., of the liquid crystal media to be used according to the invention is 0 or more, preferably 5 or more and preferably 12 or less.

The liquid crystal media to be used according to the instant invention are typically characterised by clearing points of between 100° C. and 150° C.

The nematic phase of the liquid crystal media to be used according to the instant do preferably extend to less than 20° C. or less, more preferably 15° C. or less, most preferably 10° C. or less, especially 5° C. or less.

Preferably the nematic phase of the media to be used in the inventive displays extends at least from −50° C. to 100° C., wherein at least means that preferably the lower limit is under cut, wherein the upper limit is surpassed.

In the present application the term dielectrically positive compounds describes compounds with $\Delta\varepsilon > 3.0$, dielectrically neutral compounds are compounds with $-1.5 \leq \Delta\varepsilon \leq 3.0$ and dielectrically negative compounds are compounds with $\Delta\varepsilon < -1.5$. The same holds for components. $\Delta\varepsilon$ is determined at 1 kHz and 20° C. The dielectric anisotropies of the compounds are determined from the results of a solution of 10% of the individual compounds in a nematic host mixture. The capacities of these test mixtures are determined both in a cell with homeotropic and with homogeneous alignment. The cell gap of both types of cells is approximately 10 µm. The voltage applied is a rectangular wave with a frequency of 1 kHz and a root mean square value typically of 0.5 V to 1.0 V. However, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%. Components having a nematic phase at the measurement temperature of 20° C. are measured as such. All others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. The two expressions, room temperature and ambient temperature both do refer to a temperature of 20° C., unless explicitly stated otherwise. All physical properties have been and are determined according to "Merck Liquid Crystals, Physical Properties of Liquid Crystals", Status November 1997, Merck KGaA, Germany and are given for a temperature of 20° C., unless explicitly stated otherwise. The properties of the flexoelectric materials are given at a temperature of 10 degrees centigrade below the clearing temperature of the respective material. The optical anisotropy ($\Delta n$) is determined at a wavelength of 589.3 nm. The dielectric anisotropy ($\Delta \in$) is determined at a frequency of 1 kHz. The threshold voltages, as well as all other electro-optical properties, have been determined with test cells prepared at EEV, UK. The test cells for the determination of $\Delta \in$ had a cell gap of 22 μm. The electrode was a circular ITO electrode with an area of 1.13 cm$^2$ and a guard ring. The orientation layers were lecithin for homeotropic orientation ($\in_\parallel$) and polyimide AL-1054 from Japan Synthetic Rubber for homogeneous orientation ($\in_\perp$). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)-mid grey ($V_{50}$)-and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 8 to 20 and most preferably of 10 to 16 compounds.

These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

The orientation of the liquid crystal media according to the present invention in the inventive cells is typically achieved by treating the major inner surfaces of the cell opposing each other with an aligning means for homogeneous alignment and application of an electrical field to the filled cell. The means for homeotropic orientation is an inorganic layer with a preferred direction, like e.g. obliquely evaporated SiO$_x$ or an organic layer, typically a polymeric layer, having a preferred direction, like a unidirectionally rubbed polyimide or polyamide film.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations also called acronyms. The transformation of the abbreviations into the corresponding structures is straightforward according to the following table A. All groups $C_nH_{2n+1}$ and $C_mH_{2m+1}$ are straight chain alkyl groups with n respectively m C-atoms.

TABLE A

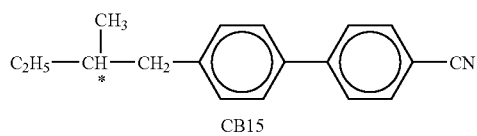

CB15

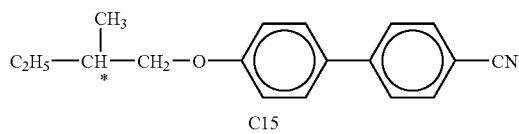

C15

TABLE A-continued

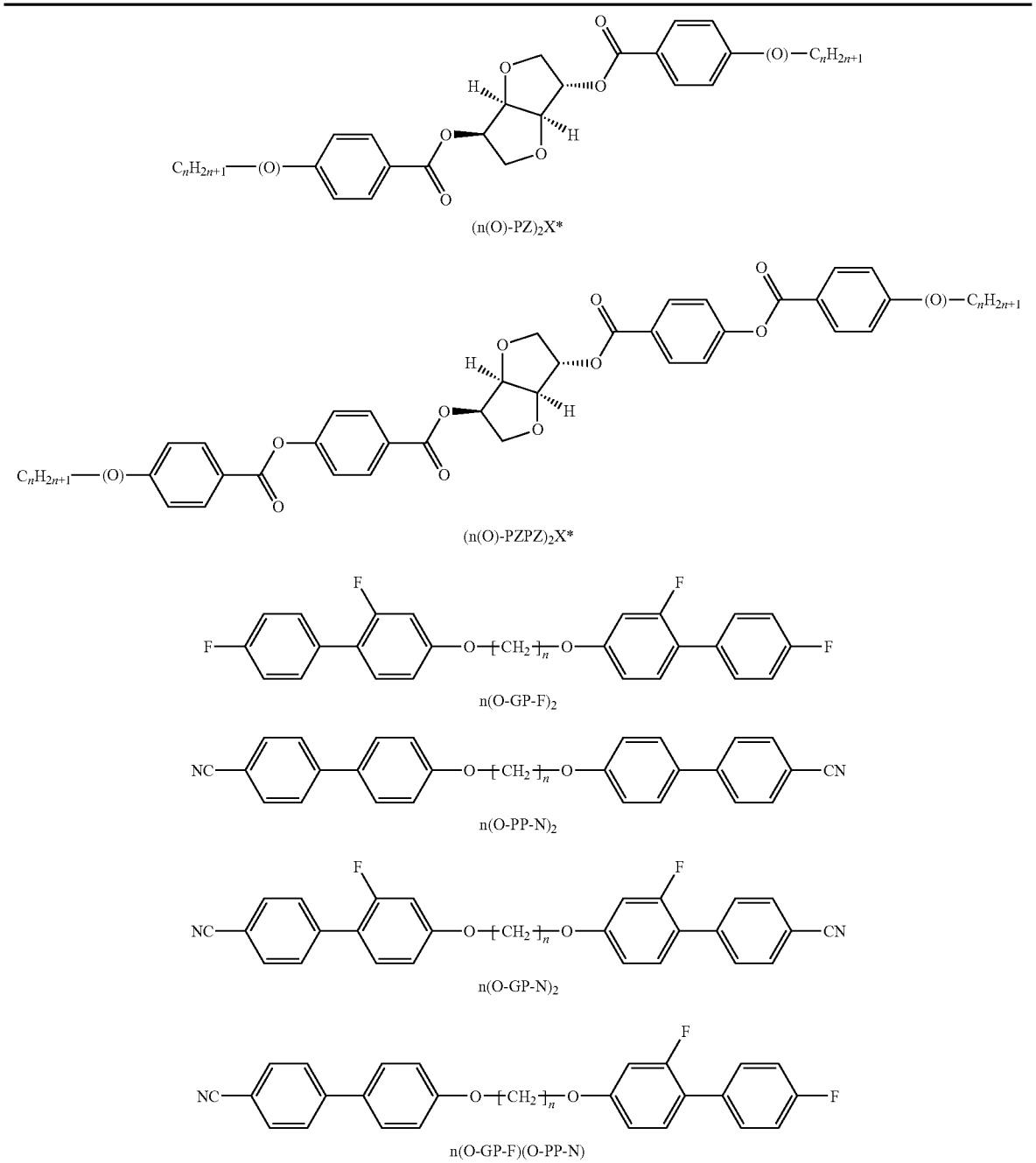

The liquid crystal media according to the instant invention do contain preferably
two or more, preferably three or more compounds, preferably of at least two, preferably three, different formulae, selected from the group of compounds of formulae of table A.

EXAMPLES

The examples given in the following are intended to illustrate the present invention without limiting its scope in any way.

However, they illustrate typical preferred embodiments. They further illustrate the use of typical and preferred constituents and exemplarily illustrate their concentrations. Further, they show possible variations of the physical properties of the products and devices, illustrating to the expert which properties can be achieved and in which ranges they can be modified. Especially they show the expert the combination of the various properties that can be preferably achieved.

The flexoelectro-optic tilt angles and the response times of the sample materials are measured with a square wave electric field applied across the 5 μm thick anti-parallel rubbed LC cells.

When the undisturbed optic axis of the LC sample mixture, i.e. in the absence of an electric field, is was located at 22.5° to the optic axis of one of a pair of crossed polarisers sandwiching the LC cell (Ψ=22.5) the maximum resolution is achieved for the flexoelectro-optic tilt angle measurements.

The tilt angle measurement is conveniently carried out using the following steps.
1. The LC sample cell is rotated until the light transmission is in its minimum (Ψ=0).
2. Then the LC cell is rotated by 22.5° (Ψ=22.5) from the position of the darkest state. A square waveform response of the light intensity is monitored using an oscilloscope and the middle point of the square wave response is marked with a cursor.
3. Subsequently the LC cell is rotated until the top of the response of the light intensity matches the cursor and the respective angle recorded.
4. Next the LC cell is then rotated in opposite direction until the bottom of the response of the light intensity matches the cursor and again the respective angle recorded.

The flexoelectro-optic tilt angle of the LC sample material is determined a half the difference between the two recorded angles because of the bipolar applied electric field.

The applied electrical field has to be kept sufficiently small in order to prevent the ULH texture from becoming unstable and the helix from unwinding.

Comparative Example 1

A mixture consisting of 96.25% of 9(O-GP-F)(O-PP-N) and 3.75% of (1O-PZPZ)$_2$X* is prepared. This mixture M1 has a phase sequence of Cr 50-N*-111-I. The cholesteric pitch is 280 nm.

Then the mixture M1 is filled into a test cell and investigated for its flexoelectric tilt angle and for its flexoelectric response and switching speed.

This mixture is aligned by application of an electric field of 2.2 V/μm. The critical field $E_c$ for helix unwinding is 9.5 V/μm.

The results are shown in FIGS. 1 and 2.

Example 1

In example 1 0.7% of FC-430 are added to 99.3% of mixture M1 of the comparative example 1. The resultant mixture M2 is investigated as described under comparative example 1. The results are shown in FIGS. 1 and 2.

The tilt angle of the optical axis of the mixture M2 is improved by approximately 20% compared to that of the mixture M1 of comparative example 1 as shown in FIG. 1.

The response time of mixture M2 is reduced by more than 30% compared to the response time of the mixture M1 at 61° C.

Example 2

As in example 1 FC-430 is added to the mixture M1, now however, in a concentration of 2.4%. The results for the mixture M3 of this example are shown in FIGS. 1 and 2 too.

The tilt angle of the optical axis of the mixture M3, like that of the mixture M2, is also is improved by approximately 20% compared to that of the mixture M1 of comparative example 1 as shown in FIG. 1.

The response time of mixture M3 is reduced even more than that of mixture M2 (i.e. by more than 38% compared to the response time of the mixture M1 at 61° C.) as shown in FIG. 2.

Example 3

In this example 0.7% of CF$_3$(CF$_2$)$_7$CH$_2$—OH are added to 99.3% of the mixture M1.

The optic axis tilt angle of mixture M4 of this example is nearly identical to that of mixture M1 of comparative example 1.

The results of the response times for the mixture M4 of this example are shown in FIG. 3 in comparison to those of mixture M1. The response time of mixture M4 is reduced by 38% compared to the response time of the mixture M1 at 61° C. as shown in FIG. 2.

Comparative Example 2

A mixture of 41% of 9(GP-F)$_2$ and 59% of 11(GP-F)$_2$ is prepared. To 96.59% of this mixture 3.41% of (10-PZPZ)$_2$X* is added. The resultant mixture M5 is investigated as described under comparative example 1 above. It has a phase sequence of Cr 18°-N*-56 I. The cholesteric pitch was 286 nm. The results for the response time of this mixture are shown in FIG. 4.

Example 4

In this example 0.6% of FC-430 are added to 99.4% of the mixture M5 of comparative example 2.

The optic axis tilt angle of mixture M6 of this example is nearly identical to that of mixture M5 of comparative example 2.

The results of the response times for the mixture M6 of this example are shown in FIG. 4 in comparison to those of mixture M1. The response time of mixture M6 is reduced by more than 20% compared to the response time of the mixture M6 at 35° C. as shown in FIG. 4.

Figure 1:
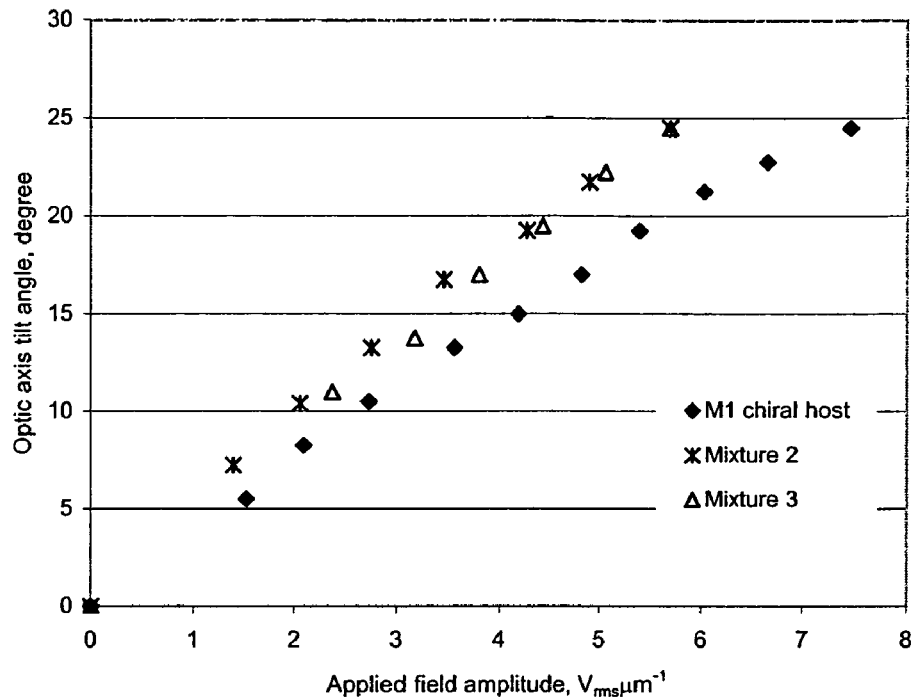
FIG. 1: Flexoelectro-optic switching properties of Mixtures M2 and M3 compared to Chiral Host Mixture M1 at 61° C.
Figure 2:
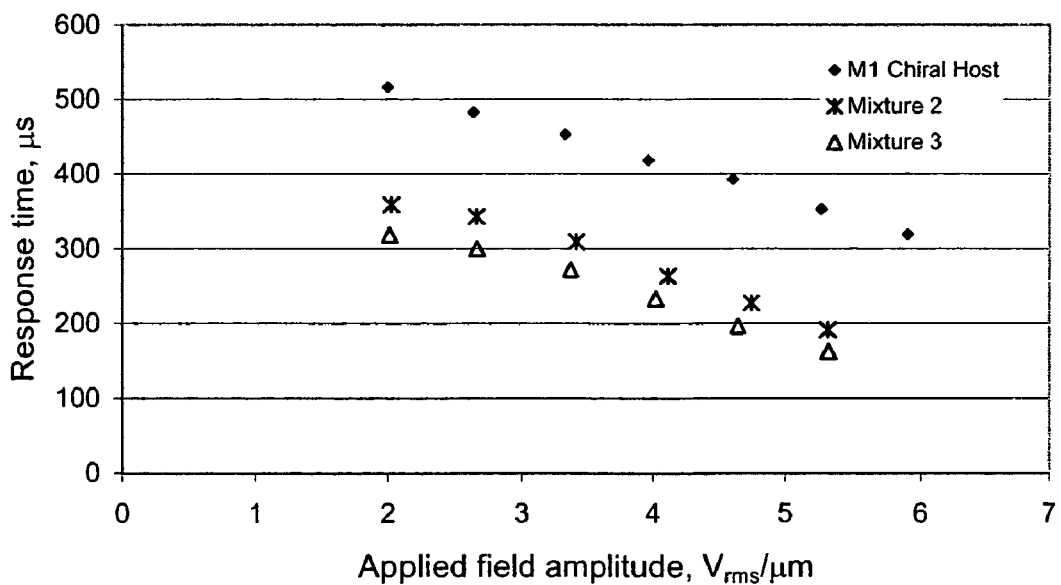
FIG. 2: Response time of Mixture 2 and Mixture 3 compared to Chiral Host Mixture 1 at 61° C. at 61° C.
Figure 3:
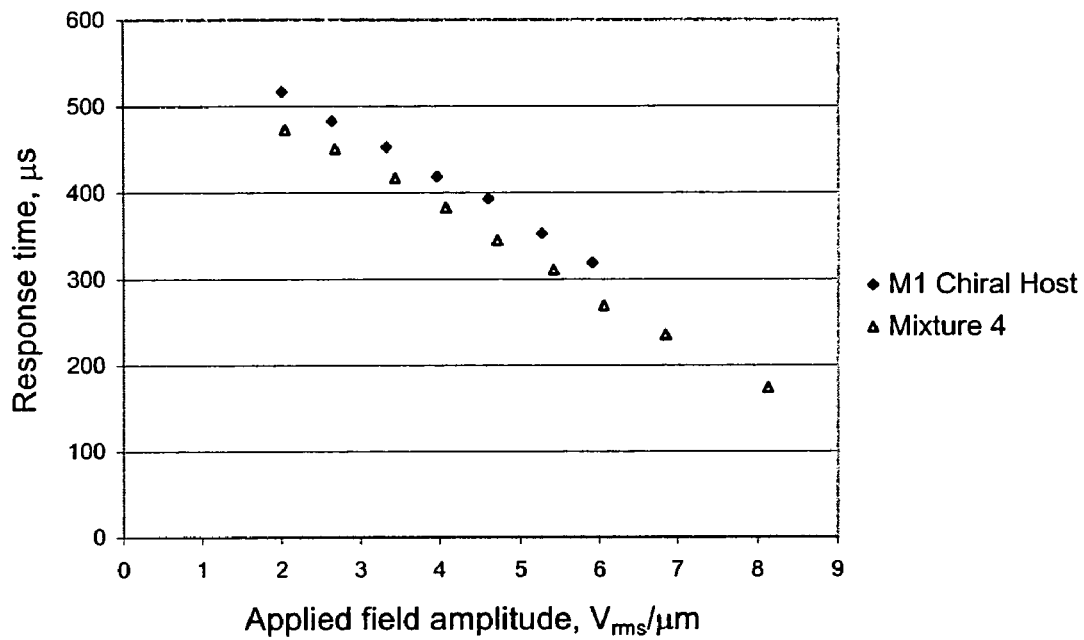
FIG. 3: Response time of Mixture 4 compared to Chiral Host Mixture 1 at 61° C.
Figure 4:
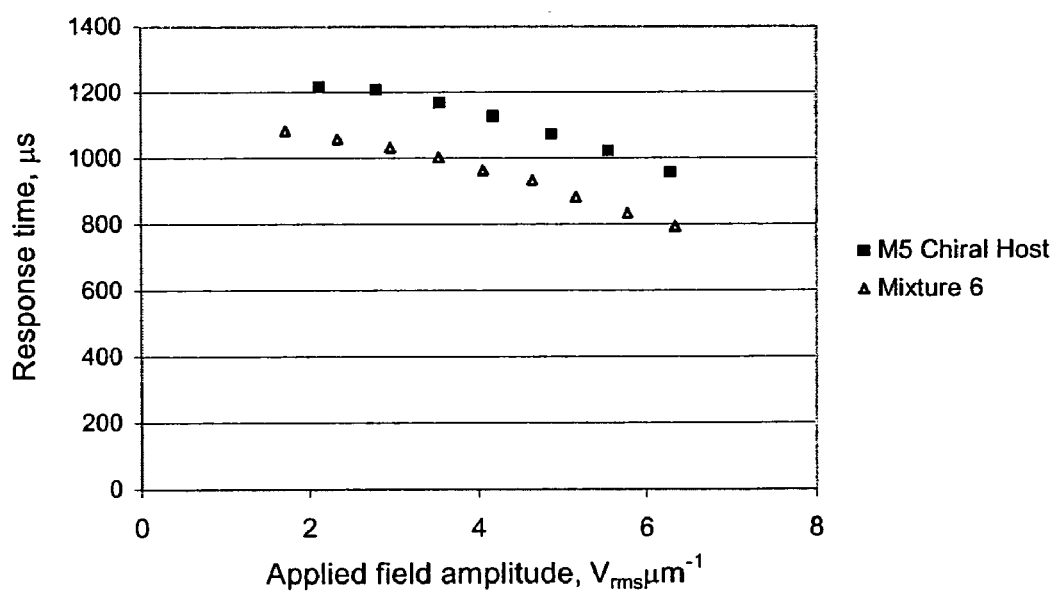
FIG. 4: Response time of Mixture 6 compared to Chiral Host Mixture 5 at 35° C.

The invention claimed is:
1. A liquid crystal display comprising
   a pair of substrates
   each bearing one or more electrodes and
   at least one substrate bearing an orientation layer for planar alignment of liquid crystals or being otherwise treated for planar orientation of liquid crystals
   a cholesteric liquid crystal material comprising
   a component A, comprising one or more bimesogenic compounds,
   a chiral component, component B, consisting of one or more compounds, and
   an additive component, component C, that is one or more fluorosurfactants.
2. The liquid crystal display according to claim 1, wherein component A of the liquid crystal material comprises one or more bimesogenic compounds with a symmetric structure and an odd number of atoms in the spacer group between the two mesogenic units and/or one or more bimesogenic compounds with a non-symmetric structure.
3. The liquid crystal display according to claim 1, having a concentration of component C in the liquid crystal material of 0.01% or more.

4. The liquid crystal display according to claim 1, wherein component A of the liquid crystal material comprises one or more compounds of formula I

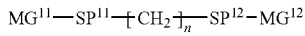

wherein
$SP^{11}$ and $SP^{12}$, independently of each other are —O—, —CO—O—, —O—CO—, —CF$_2$—O—, —O—CF$_2$—, —C≡C or a single bond,
n is an integer in the range from 2 to 18,
$MG^{11}$ is

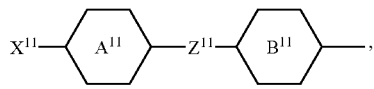

$MG^{12}$ is

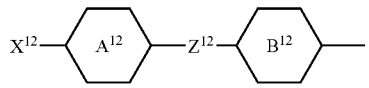

wherein

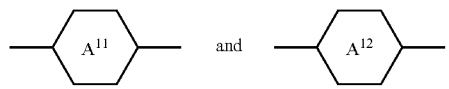

independently of each other are

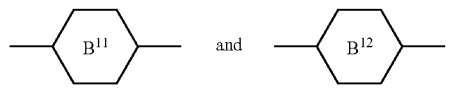

independently of each other are

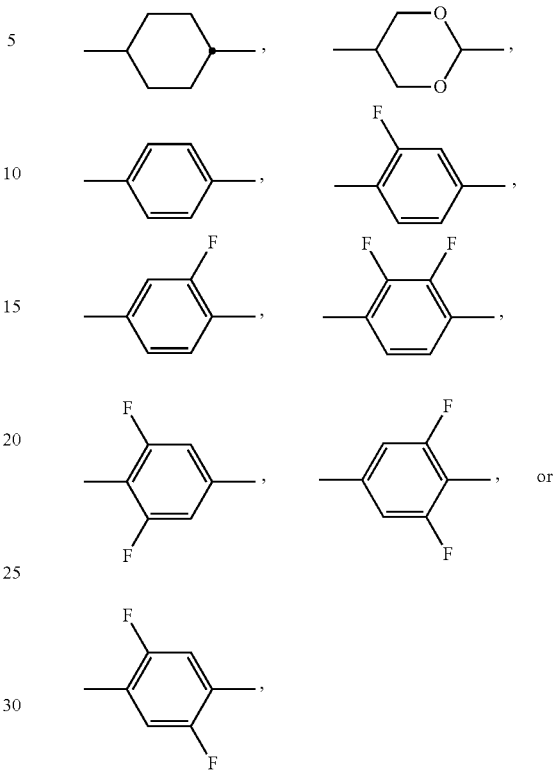

$X^{11}$ and $X^{12}$ independently of each other are CN, F, Cl or alkyl, alkoxy, fluorinated alkyl or fluorinated alkoxy, each with 1 to 4 C-atoms, and
$Z^{11}$ and $Z^{12}$ independently of each other are —CO—O—, —O—CO—, —CH$_2$—O—, —O—CH$_2$—, —CF$_2$—O—, —O—CF$_2$—, —CH$_2$—CH$_2$—, —C≡C—, —CH(CH$_3$)—N=CH— or a single bond.

5. The liquid crystal display according to claim 1, wherein component A of the liquid crystal material comprises one or more compounds of formulae I-1 to I3

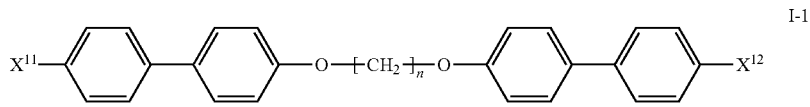

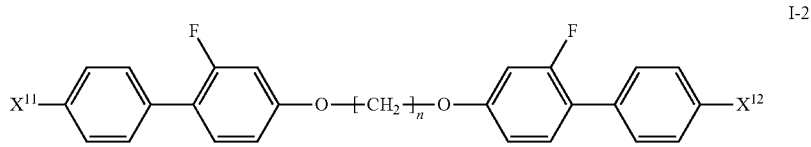

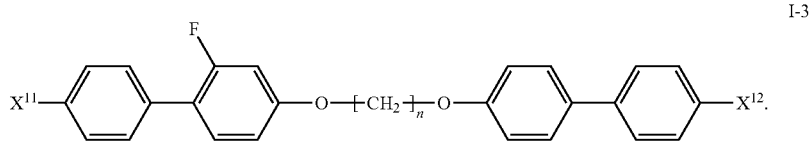

6. The liquid crystal device according to claim 1 displaying video images.

7. A liquid crystal device, comprising a liquid crystal display according to claim 1.

8. The liquid crystal device according to claim 7, that is an electro-optical display device.

9. A method of manufacturing a liquid crystal display according to claim 1, comprising combining a pair of substrates each bearing one or more electrodes and at least one substrate bearing an orientation layer for planar alignment of liquid crystals or being otherwise treated for planar orientation of liquid crystals a cholesteric liquid crystal material comprising a component A, comprising one or more bimesogenic compounds, a chiral component, component B, consisting of one or more compounds, and an additive component, component C, that is one or more fluorosurfactants.

10. A method of manufacturing a liquid crystal device comprising combining a liquid crystal display according to claim 1 and a display device.

11. The liquid crystalline display according to claim 4, wherein $SP^{11}$ and $SP^{12}$ are each independently —O—, —CO—O—, —O—CO—, —C≡C or a single bond.

12. The liquid crystalline display according to claim 4 wherein n is 3-17.

13. The liquid crystalline display according to claim 4 wherein

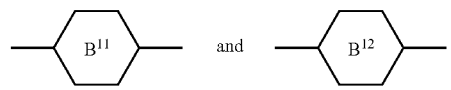

are each independently

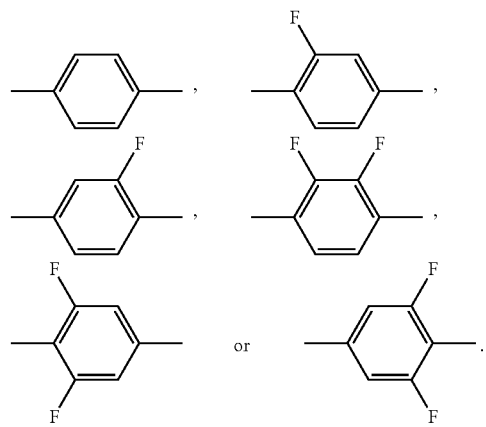

14. The liquid crystalline display according to claim 4, wherein $X^{11}$ and $X^{12}$ are each independently CN, F, Cl or alkyl.

15. The liquid crystalline display according to claim 4, wherein $Z^{11}$ and $Z^{12}$ are each independently a single bond.

* * * * *

UNITED STATES PATENT AND TRADEMARK OFFICE
CERTIFICATE OF CORRECTION

PATENT NO. : 8,377,519 B2  Page 1 of 1
APPLICATION NO. : 12/304034
DATED : February 19, 2013
INVENTOR(S) : Farrand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this
First Day of September, 2015

Michelle K. Lee
*Director of the United States Patent and Trademark Office*